(12) United States Patent
Holtmann et al.

(10) Patent No.: US 9,380,745 B2
(45) Date of Patent: Jul. 5, 2016

(54) SEPARATING DEVICE

(71) Applicant: CLAAS SELBSTFAHRENDE ERNTEMASCHINEN GMBH, Harsewinkel (DE)

(72) Inventors: Bernd Holtmann, Sendenhorst (DE); Markus Pellmann, Sassenberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 12 days.

(21) Appl. No.: 14/486,102

(22) Filed: Sep. 15, 2014

(65) Prior Publication Data
US 2015/0087363 A1 Mar. 26, 2015

(30) Foreign Application Priority Data
Sep. 24, 2013 (DE) .......................... 10 2013 110 542

(51) Int. Cl.
| | | |
|---|---|---|
| *A01F 7/06* | (2006.01) | |
| *A01F 7/02* | (2006.01) | |
| *A01F 12/20* | (2006.01) | |
| *A01F 12/22* | (2006.01) | |
| *A01F 12/24* | (2006.01) | |
| *A01F 12/26* | (2006.01) | |

(52) U.S. Cl.
CPC . *A01F 7/02* (2013.01); *A01F 7/067* (2013.01); *A01F 12/20* (2013.01); *A01F 12/22* (2013.01); *A01F 12/24* (2013.01); *A01F 12/26* (2013.01)

(58) Field of Classification Search
CPC ......... A01D 45/025; A01F 7/06; A01F 12/20; A01F 12/22; A01F 12/442; A01F 12/00; A01F 7/02; A01F 7/067; A01F 12/24; A01F 12/26
USPC .......... 56/14.7; 460/66–75, 110, 122
See application file for complete search history.

(56) References Cited

U.S. PATENT DOCUMENTS

| | | | | |
|---|---|---|---|---|
| 5,192,245 A | * | 3/1993 | Francis ................... | A01F 12/22 460/110 |
| 7,022,013 B1 | * | 4/2006 | Van Quekelberghe ... | A01F 7/06 460/66 |
| 8,079,899 B2 | * | 12/2011 | Schwersmann ........... | A01F 7/06 460/66 |
| 8,142,266 B2 | | 3/2012 | Imbert et al. | |
| 2010/0043371 A1 | * | 2/2010 | Rieck ................... | A01D 45/025 56/14.7 |

FOREIGN PATENT DOCUMENTS

EP     2 298 063     3/2011

\* cited by examiner

*Primary Examiner* — Robert Pezzuto
(74) *Attorney, Agent, or Firm* — Michael J. Striker

(57) ABSTRACT

A separating device formed with rotationally driven components and stationary components has at least one crop-treatment element for processing crop. The crop-treatment element extends transversely to the rotational direction (R) of the components, at least in sections. The crop-treatment element has a substantially cuboid cross-section and a front edge with a curved course optimized in terms of flow, and which faces a rotational direction (R) and away from a conveyance direction (FR) of the crop.

9 Claims, 4 Drawing Sheets

SEPARATING DEVICE

CROSS-REFERENCE TO A RELATED APPLICATION

The invention described and claimed hereinbelow is also described in German Patent Application DE 10 2013 110452A, filed on Sep. 24, 2013. The German Patent Application, the subject matters of which is incorporated herein by reference, provides the basis for a claim of priority of invention under 35 U.S.C. 119(a)-(d).

BACKGROUND OF THE INVENTION

The present invention relates to a separating device.

Known separating devices can be designed as axial separating rotors of a combine harvester, which are used to separate crop picked up by the combine harvester into the different components thereof, and to separate and remove said components. The crop is separated by the separating device into a grain component and a non-grain component, such as straw and chaff, by a treatment process, which physically acts on the crop.

Document EP 2 298 063 A2 makes known a separating device, which is designed as an axial threshing-separating rotor. This axial threshing-separating rotor has the task of collecting grain contained in the crop in a first step via threshing, wherein the grain is separated from non-grain components. The grain is threshed and largely separated out in threshing section adjoining an inflow region of the axial threshing-separating rotor. Parts of the threshed-out grain reach the subsequent separating region of the axial threshing-separating rotor along with the non-grain components. The remaining grain is separated from the non-grain components in the separating region. The threshing section of the axial threshing-separating rotor comprises crop-treatment elements embodied as grates, which extend substantially transversely to the rotational direction of the axial threshing-separating rotor. The grates are directly engaged with the crop, which exerts a highly abrasive effect on the grates.

According to EP 2 298 063 A2, the grates have a circular cross-section in order to reduce grain damage. The grates are disposed on a ramp-shaped support element, which extends downward in the rotational direction of the axial threshing-separating rotor and extends into the crop stream. The ramp-shaped support element has a front side having a right-angled cross section in order to achieve a level of aggressiveness that is required for the threshing. The wear that occurs on the sharp-edged front edge of the ramp-shaped support element is correspondingly high, which is due to the high bearing pressure in this region. The high bearing pressure is exerted by the crop onto the support element, in particular onto the front edge facing the crop stream. A coating on the surface of the element, which is applied as protection against wear, is also worn off by the crop, thereby making it necessary to replace the support element and grates located thereon at regular, short intervals of time.

SUMMARY OF THE INVENTION

The present invention overcomes the shortcomings of known arts, such as those mentioned above.

To that end, the present invention provides a separating device designed in a way that longer service lives of the crop-treatment elements that are particularly exposed to wear can be achieved.

In an embodiment, the at least one crop-treatment element, which has a substantially cuboid cross-section, has a front edge, which faces the direction of rotation and away from a conveyance direction of the crop and has a curved shape that is optimized in terms of flow. The front edge, which extends in the axial direction of the crop-treatment element, forms a transition from a substantially perpendicular section of the crop-treatment element to a substantially horizontal section. In this manner, the bearing pressure of the section of the crop-treatment element that first comes into contact with the crop-treatment element is reduced, thereby reducing wear.

The level of aggression required for the threshing process and which is exerted onto the crop is substantially determined by the cuboid cross-section. In particular, the course that is optimized in terms of flow results in an approximately constant bearing pressure, which is applied by the crop stream onto the front edge of the crop-treatment element. The bearing pressure applied by the crop is varied by the course of the front edge. In particular, the curved course of the front edge is adapted to different types of crop. It is thereby possible to account for the different wear behavior associated with the particular crop type.

Preferably, the course of the front edge can be convex. It is thereby possible to achieve a gentle deflection of crop in the region of the front edge. In contrast thereto, a concavely embodied front edge could result in a hollowing-out of the crop-treatment element, which would result in greater wear.

Advantageously, the front edge is provided, at least in sections, with a coating in order to increase the wear-resistance. The service life of the crop-treatment element is additionally increased as a result. The resistance of the coating itself also is increased by the curved front edge of the crop-treatment element, which has been optimized in terms of flow. The crop-treatment element is made of a material having relatively low hardness. The front edge, which has been optimized in terms of flow and is most exposed to the abrasive effect of the crop stream, is provided with a coating having great hardness. The coating, at least in sections, is applied depending on the expected bearing pressure that is exerted by the crop onto the crop-treatment element.

Preferably, a material reserve is applied in highly-stressed regions of the crop-treatment element during the production thereof. This material reserve is used as a wear reserve. The build-up of the material reserve is achieved by suitable production methods such as casting, forging, or hot forming.

The radius of curvature of the front edge of the crop-treatment element is variable depending on the material of which the coating is made. The radius of curvature can be reduced as the material hardness of the coating applied onto the front edge increases. The coating can be applied by common coating methods, such as thermal spraying, build-up welding, sintering, laser coating, chemical vapor deposition, physical vapor deposition, or seal-in alloys that are applied in a liquid state and are hard-material cured.

As an alternative or, in addition thereto, the at least one crop-treatment element is made of a wear-resistant material. Curable steel materials are options for use as the basic material for a crop-treatment element, which continuously comprises a wear-resistant material and has a front edge that has been optimized in terms of flow. These steel materials can be case-hardened after shaping. These steel materials also can be inductively or conductively cured after shaping. In addition, press quenching can be utilized for curable steel materials. The crop-treatment element is curved entirely or only in regions directly after being shaped in a tool.

The radius of curvature of the front edge of the crop-treatment element can vary depending on the material of which the crop-treatment element is made. As the hardness of the material used for the crop-treatment element increases, the radius of curvature can be selected to be smaller in order to approximate a sharp-edged shape of the front edge. The reduction of the radius of curvature is limited by the exponentially increasing wear resulting from the increasing bearing pressure.

Preferably, the at least one crop-treatment element is disposed in the inflow region of a separating device designed as an axial separating rotor. The axial separating rotor is designed as an axial threshing-separating rotor, the threshing elements of which are embodied in the shape of grates. The axial separating rotor is disposed downstream of a tangentially operating threshing device, which comprises crop-treatment elements embodied as grates in the inflow region and are designed as guidance and conveyance elements for the crop.

In this inflow region, the at least one grate is impacted by non-grain components as well as grain, which has a greater abrasive effect than non-grain components. The effect of this on the wear behavior of the at least one grate can be reduced by the measured described herein. The inflow region of the axial separating rotor is adjoined by a central region, in which the remaining grain is separated from the developing straw mat and is separated out by separating grates. Crop-treatment elements, which are embodied as so-called fingers and loosen the straw mat, are disposed in this central region. These fingers also can be embodied accordingly with a front edge that is optimized in terms of flow.

The at least one crop-treatment element also can be disposed in the outflow region of a separating device designed as an axial separating rotor, i.e., embodied as a so-called paddle.

In addition, the at least one crop-treatment element also can be embodied as a beating arm, which is disposed coaxially to a drum of a separating device embodied as a threshing device, on the periphery thereof.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
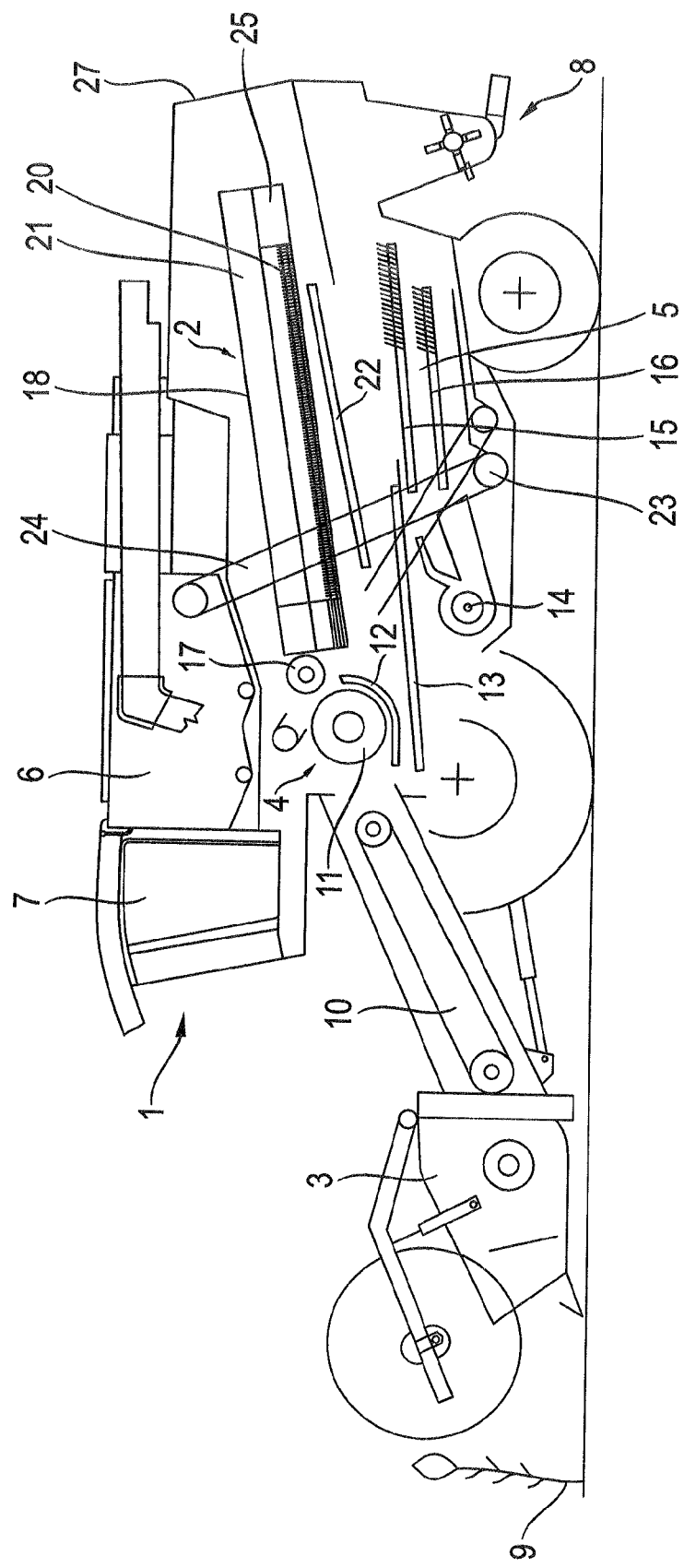
FIG. 1 shows a schematic view of a combine harvester.

The combine harvester 1 depicted schematically in FIG. 1 comprises an axial separator 2, a header 3, a threshing unit 4, a cleaning unit 5, a grain tank 6, a driver's cab 7 and a further-handling device 8 for the residual crop flow, which is disposed downstream of the axial separator 2, and a straw chopper and/or a spreader The crop 9 cut by the header 3 travels through a feeder housing 10 to the thresher unit 4 operating according to the tangential principle. The thresher unit comprises a cylinder 11 and an assigned concave 12. The crop components separated out on the concave 12 are conveyed by way of a grain pan 13 to the cleaning unit 5, which comprises a fan 14 and an upper and lower sieve 15, 16. The grain-short straw mixture that emerges from the concave 12 in the tangential direction is conveyed into the axial separator 2. The conveying process is supported by a rotating impeller 17 disposed parallel to the cylinder 11.

The axial separator 2 is disposed in the longitudinal direction of the combine harvester 1 and substantially comprises a stationary, cylindrical housing 18 which rises in the conveyance direction FR, and in which a rotatably driven separating rotor 19 is supported. The housing 18 has a lower region having separating grates 20 and a closed, upper concave cover 21 having guidance devices disposed on the inner side for supporting the conveyance motion of the crop. The separating rotor 19 is equipped with crop-treatment elements on the periphery thereof, as viewed in the axial direction. The crop-treatment elements have various designs and are, for example, crop treatment elements 30, fingers 31, or paddles 32, which partially have the function of intensifying the separating procedure. All the crop-treatment elements have a cuboid cross-sectional shape and, due to the function thereof, have constant contact with the crop, which is conveyed by the separating rotor 19, and all have an abrasive effect.

The grains contained in the crop mixture and portions of short straw and chaff are separated out on the separating grates 20 and are conveyed to the cleaning unit 5 by way of the return pan 22 located thereunder. The cleaned grains travel by way of a conveyor auger 23 and an elevator 24 into the grain tank 6. Inside the axial separator 2, the straw and chaff forming the crop residue are conveyed in the direction of the transfer region 25 and, from there, travel by way of an outlet and, in a distributed manner, reach the further-handling unit 8, which is attached to a frame underneath a straw outflow hood 27 transversely to the direction of travel.

Figure 2:
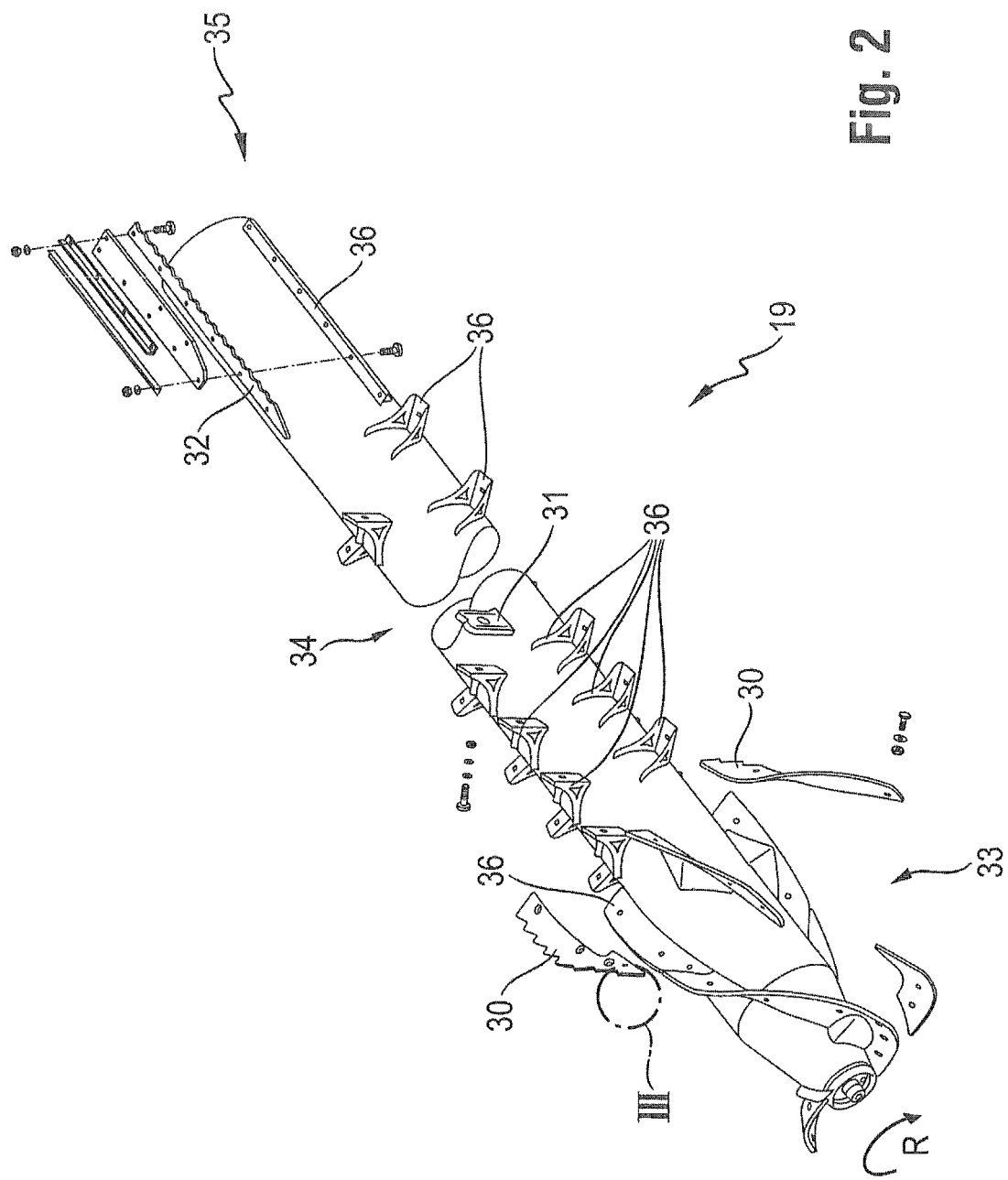
FIG. 2 shows an exploded view of a separating rotor.

FIG. 2 shows the separating rotor 19 of the axial separator 2. The separating rotor 19 substantially comprises an inflow region 33, a central region 34, and an outflow region 35. The inflow region 33 is used to receive the crop 9, which substantially comprises straw and grain conveyed therewith after the threshing process. In the central region 34 of the separating rotor 19, the fingers 31 act on the crop mat forming between the separating rotor 19 and the separating grates 20 and the concave cover 21 in order to remove the remaining grain from the straw and remove the grain through the separating grates 20. In the outflow region 35, the straw is transferred to the further-handling device 8.

As mentioned above, the separating rotor 19 comprises different crop-treatment elements in the respective regions 33, 34, 35, which are detachably fastened on the separating rotor 19 by holders 36 provided thereon for this purpose. The crop-treatment elements are detachably attached due to the wear to which the crop-treatment elements are exposed during the processing of the crop. The wear behavior is influenced by the material of which the crop-treatment elements are made and by the geometric shape of the various crop-treatment elements. In addition, the type of crop to be processed has a considerable influence on the service life of the crop-treatment elements, since, for example, the requirements for wear-resistance in the case of processing rice as the crop are particularly high.

As is evident from the exploded view according to FIG. 2, the crop treatment elements 30 embodied as crop-treatment elements have a substantially cuboid cross-section, as viewed in the radial direction, although these also can have a spiral shape as viewed in the axial direction. The fingers 31 and the paddles 32 also have a substantially cuboid cross-section. The crop treatment elements 30, the fingers 31, and the paddles 32 are arranged, as viewed in the rotational direction R of the separating rotor 19, such that these come into contact with the crop first.

Figure 3:
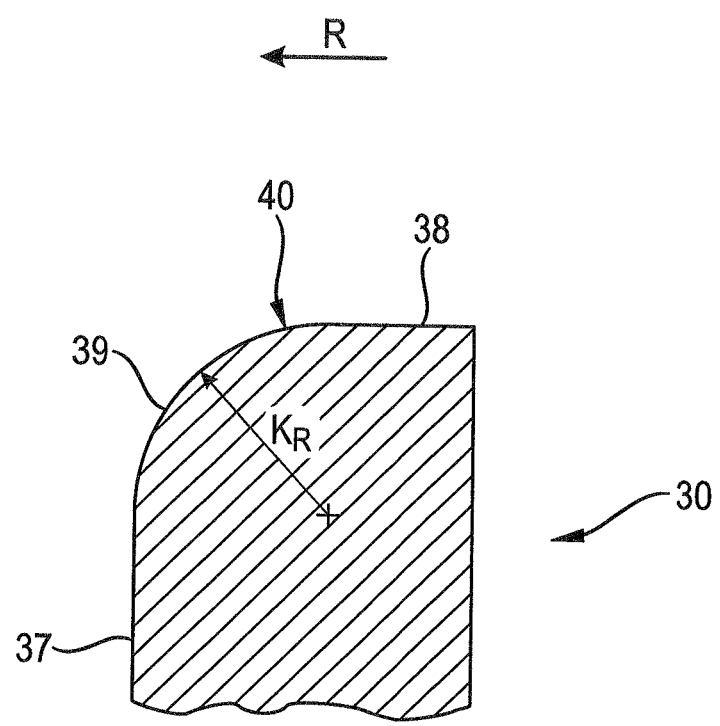
FIG. 3 shows a detailed view III of a grate according to FIG. 2.
Figure 4:
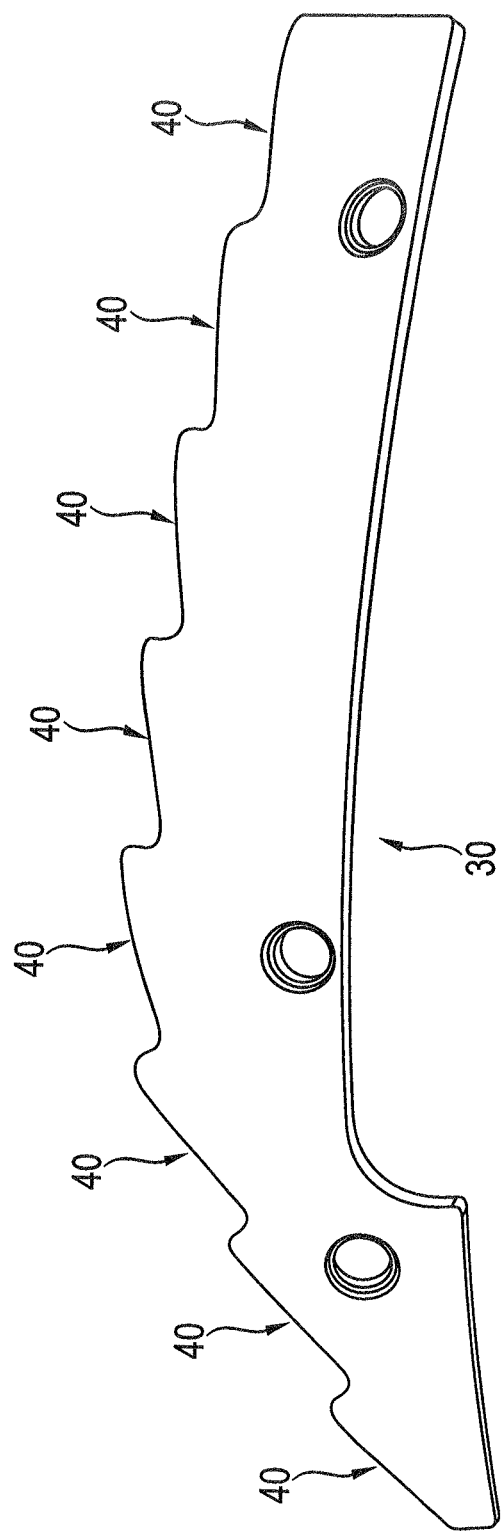
FIG. 4 shows the crop treatment element 30 in its entirety.

FIG. 3 shows an enlarged detailed sectional view III according to FIG. 2 of a crop treatment element 30, where FIG. 4 shows the crop treatment element 30 in its entirety. The illustration shows the upper section of the grate, the front edge 40 of which, facing the rotational direction of the separating rotor 19, comes into contact with the crop first. The front edge 40 of the crop treatment element 30, which forms between a substantially vertical section 37 and a substantially horizontal section 38 adjacent thereto has a curved course that is optimized in terms of flow. Due to the curved course of the front edge 40, the bearing pressure induced by the impacting crop is reduced in this region. The wear of the surface of the front edge 40 is therefore markedly reduced.

The course of the convex front edge 40 is described by the radius of curvature KR thereof. The radius of curvature KR varies depending on the hardness of the material of which the crop-treatment elements such as the crop treatment element 30, the finger 31, or the paddle 32 are made. As the hardness of the material of which the crop-treatment element is made increases, the radius of curvature KR can be selected to be smaller. Since the basic material of which the crop-treatment element is made generally does not have very great hardness, for reasons of processability, a wear-protection layer is applied onto the front edge 40 in the form of a coating 39.

The material used for the coating 39 has a markedly greater hardness than the basis material of the crop-treatment element. In the coating of the front edge 40 as well, there is a dependence between the hardness of the material used for the coating 39 and the radius of curvature KR that describes the course of the front edge 40. The curved course of the front edge 40, which is optimized in terms of flow, is also advantageous in terms of the application of a coating 39, since, due to the reduced bearing pressure, the coating 39 is not stressed or worn off to the extent that is the case with a sharp-edged course of the front edge according to the prior art.

LIST OF REFERENCE SIGNS 1 combine harvester
2 axial separating device
3 header
4 threshing unit
5 cleaning mechanism
6 grain tank
7 driver's cab
8 further-handling unit
9 crop
10 feeder housing
11 cylinder
12 concave
13 grain pan
14 fan
15 lower sieve
16 upper sieve
17 impeller
18 housing
19 separating rotor
20 separating grate
21 concave cover
22 return pan
23 conveyor auger
24 elevator
25 transfer region
26 outlet width
27 straw outflow hood
30 crop treatment element
31 finger
32 paddle
33 inflow region
34 central region
35 outflow region
36 holders
37 vertical section
38 horizontal section
39 coating
40 front edge
R rotational direction
KR radius of curvature
FR conveyance direction As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A separating device, comprising:
   rotationally driven components; and
   stationary components;
   wherein the rotationally driven components have at least one crop-treatment element for processing crop, which extends transversely to a rotational direction (R) of the rotationally driven components, at least in sections;
   wherein the at least one crop-treatment element has a substantially cuboid cross-section and a front edge with a curved course designed to optimize flow and to face the rotational direction (R) and away from a conveyance direction (FR) of the crop.

2. The separating device according to claim 1, wherein the curved course of the front edge is convex.

3. The separating device according to claim 2, wherein the curved course of the front edge is provided, at least in sections, with a coating for increasing a wear resistance.

4. The separating device according to claim 3, wherein the curved course of the front edge of the crop-treatment element has a radius of curvature (KR) that varies depending on a material of which the coating is made.

5. The separating device according to claim 1, wherein the at least one crop treatment element is made of a wear-resistant material.

6. The separating device according to claim 4, wherein a radius of curvature (KR) of the front edge of the at least one crop treatment element varies depending on the material of which the at least one crop-treatment element is made.

7. The separating device according to claim 1, wherein the at least one crop-treatment element is disposed in an inflow region that is designed as an axial separating rotor.

8. The separating device according to claim 1, wherein the at least one crop-treatment element is disposed in an outflow region that is designed as an axial separating rotor.

9. A combine harvester comprising a separating device according to claim 1, wherein the separating device further comprises a rotationally driven component and wherein the at least one crop-treatment element is embodied as a beating arm that is coaxially disposed to the rotationally driven component on a periphery thereof.

\* \* \* \* \*